Jan. 21, 1969 I. B. KATZEF ET AL 3,423,038

CASSETTE TAPE WINDING INDICATOR MEANS

Filed March 24, 1967

INVENTORS.
IRVING B. KATZEF
GEORGES D. ABITBOUL

By White & Haefliger

ATTORNEYS.

United States Patent Office 3,423,038
Patented Jan. 21, 1969

3,423,038
CASSETTE TAPE WINDING INDICATOR MEANS

Irving B. Katzef and Georges D. Abitboul, Los Angeles, Calif., assignors to Audio Magnetics Corporation, Gardena, Calif., a corporation of California Filed Mar. 24, 1967, Ser. No. 625,775
U.S. Cl. 242—55.13 4 Claims
Int. Cl. G11b 15/32

ABSTRACT OF THE DISCLOSURE

The disclosed tape cassette incorporates a case having an elongated opening along one edge to expose tape traveling along that edge. A first leader strip is attached at one end to a first reel and at the opposite end to magnetic tape, and a second leader strip is attached at one end to a second reel and at the opposite end to the tape. The first strip has one distinguishing color, and the second strip has another distinguishing color, to be exposed along the cassette case edge opening for indicating whether the tape is wound on the first or second reel.

BACKGROUND OF THE INVENTION

This invention relates generally to tape cassettes, and more particularly concerns the indication of the extent of magnetic tape winding in such cassettes.

Tape cassettes typically include a hollow case and a pair of magnetic tape winding reels mounted in the case to be turned when the cassette is removably mounted on playback equipment. The tape typically includes tracks enabling it to be played in each direction of winding with respect to the reels. In order to know which track is in position to be played next, the user must know the condition of tape winding on the reels. In the past, this information was intended to be conveyed to the user by means of windows in opposite sides of the case permitting viewing of the extent of tape winding on the reels; however, such viewing is deceptive because when viewing the window at one side of the case the tape appears to be wound on a left hand reel, whereas when the case is turned over and the window at the opposite side is viewed, the tape appears to be wound on the right hand reel. Only when the cassette is mounted in the playback equipment and playback is begun is the user apprised of what the tape winding condition was, but this procedure requires the extra step of actual playing.

SUMMARY OF THE INVENTION

The present invention has as its major object the elimination of the above described difficulty, through the provision of tape winding indicators that cannot be confused. In this regard, the case has an elongated opening along one edge thereof to expose tape traveling lengthwise along that edge to playback equipment structure that engages and magnetically reads the tape. Basically, the invention concerns the provision of a first leader strip attached at one end to a first reel in the case and at the opposite end to one end portion of magnetic tape, and a second leader strip attached at one end to a second reel and at the opposite end to the opposite end portion of the magnetic tape. Further, the first leader strip has a length to be pulled into full view exposed at the case edge opening when the tape is fully wound on the second reel, and the second leader is of a length to be pulled into full view exposure at the case edge opening when the tape is fully wound on the first reel; and finally, the first leader strip has one distinguishing color extending sufficiently along the case edge opening when the tape is fully wound on the second reel as to indicate such full winding on the second reel, and the second leader strip has another distinguishing color extending sufficiently along the case edge opening when the tape is fully wound on the first reel as to indicate such full winding on the first reel. As a result, the user has positive knowledge of the status of tape winding on the reels.

Further aspects of the invention include the provision of a first tape leader strip consisting of plastic material and having a reddish color, and the provision of a second tape leader strip consisting of plastic material and having a greenish color; and the provision of one color extending throughout the exposed length of the first leader along the case edge opening when the tape is fully wound on the second reel, and the other color extending throughout the exposed length of the second leader along the case edge opening when the tape is fully wound on the first reel. In these regards, each leader strip is about six inches long and is connected to an end of the magnetic tape by a short strip of material bonded to the leader and tape.

These and other objects and advantages of the invention, as well as the details of an illustrative embodiment, will be more fully understood from the following detailed description of the drawings, in which:

DESCRIPTION OF THE PREFERRED EMBODIMENT

Figures 1, 2, 3, 4:
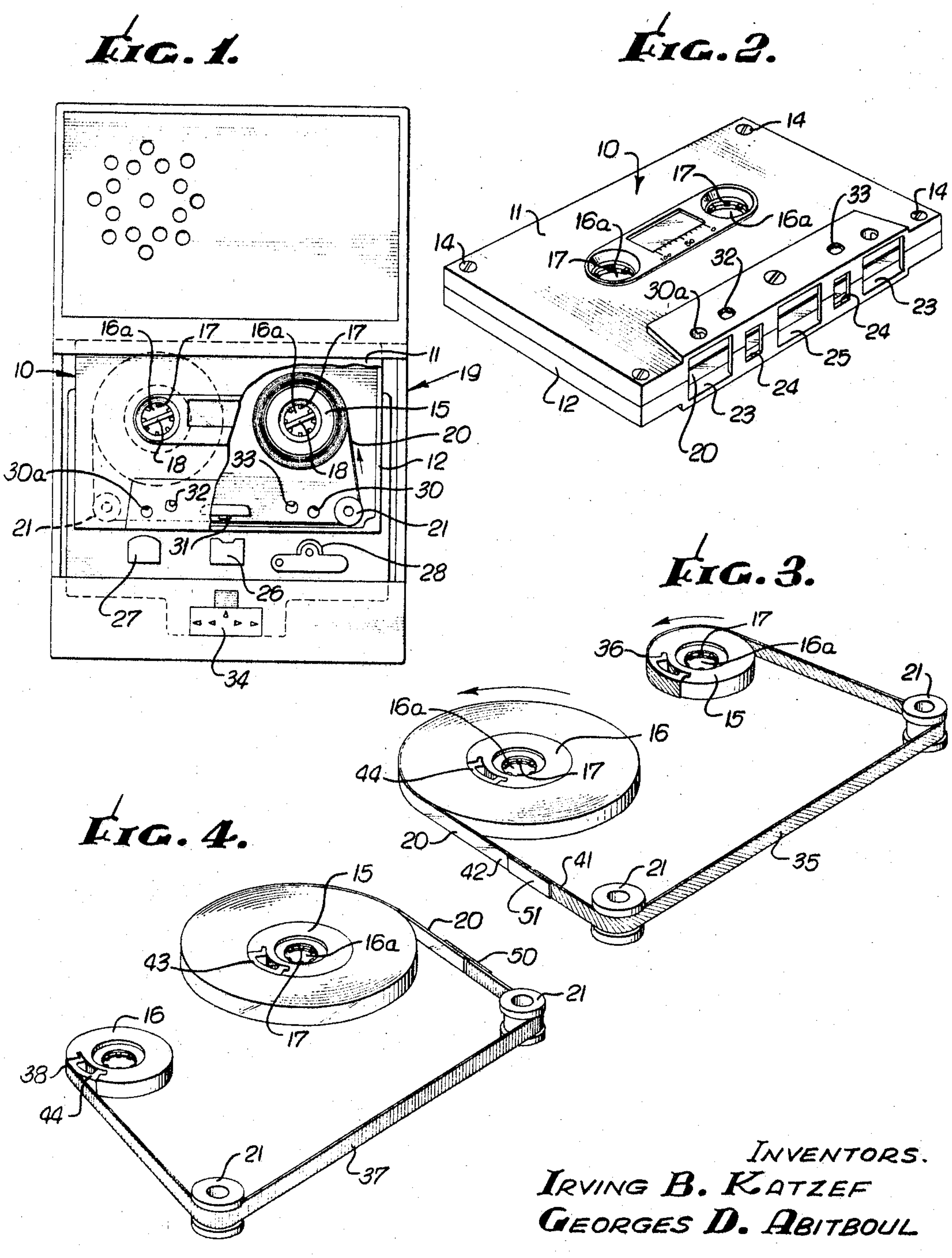
FIG. 1 is a plan view showing the relationship of the cassette to playback equipment.
FIG. 2 is a perspective view of the cassette.
FIGS. 3 and 4 are perspective showings of the differentially colored leader strips and tape connected thereto.

Referring first to FIGS. 1 and 2, the tape cassette is shown to include a hollow case 10 having upper and lower case sections 11 and 12 which are suitably attached together as by the fasteners 13 and 14. Mounted in the case are a pair of winding reels 15 and 16, suitable annular flanges in the case sections supporting the reels for rotation. The reels are themselves annular to form central openings **16*a* into which the lugs 17 on the reels project inwardly toward the axes of rotation, as shown. These lugs interfit a driving element shown at 18 in FIG. 1, and which is a part of the playback unit 19. Accordingly, during playback the tape 20 is wound on the reel 15, as shown, in response to rotation of the driving element 18**.

Also contained within the case are two idler rolls 21 about which the tape travels during advancement thereof. In this regard, the case has an elongated opening along one edge thereof to expose tape traveling lengthwise along said edge. FIG. 2 shows the elongated opening in the form of sections 23, 24 and 25 through which the tape is exposed to the exterior during tape travel between the rollers 21. In this regard, when the cassette is mounted on the playback equipment 19, the tape is exposed to a magnetic read/write head 26 opposite opening 25, an erase head 27 opposite an opening 23 and an idler roller 28 opposite the other opening 23. In this regard, the heads 26 and 27 and the roller 28 are relatively movable into engagement with the tape proximate the openings 23 and 25 in order to enable operation of the equipment. Similarly, these elements are movable relatively away from the tape to facilitate mounting and demounting of the cassette in the playback equipment. Aligned openings 30 in the case are adapted to receive a rotary capstan immediately behind the tape for driving the latter when the idler roller 28 urges the tape into contact with the capstan. A similar pair of aligned openings appear at **30*a*** for the same use when the cassette is turned over for driving the tape in the opposite direction.

A spring urged support 31 is located inwardly of the tape and opposite the magnetic head 26, the support being carried by the cassette and typically consisting of a piece of soft felt. The support serves as a back-up for the tape when the magnetic head is brought into contact with the opposite side of the tape. Finally, two pairs of aligned openings 32 and 33 are formed in the case to receive posts for locating and locking the cassette in place upon the playback equipment 19. A manual control is shown at 34 and is operable to effect displacement of the heads 26 and 27 and roller 28 relatively into engagement with the tape and to initiate and stop advancement of the tape as described.

Coming now to the improvement with which the invention is concerned, as related to the specific cassette described, reference is had to FIGS. 3 and 4 wherein the tape reels 15 and 16 are shown in perspective. In this regard, a first leader strip is shown at 35 as attached at one end 36 to a first reel, i.e. reel 15, and at the opposite end 41 to an end portion 42 of the magnetic tape 20, and a second leader strip 37 is attached at one end 38 to a second reel, i.e. reel 16, and at the opposite end 39 to the opposite end portion 40 of the magnetic tape 20. In this regard, the reels 15 and 16 may have expansible U-shaped plastic inserts 43 and 44 snapped into corresponding cutouts in the reel peripheries, and the leader ends may be clamped between the legs of the inserts and the reel cutouts upon expansion of the inserts.

It will further be noted that the first leader strip 35 is of a length to be pulled into full view exposure at the case edge opening when the tape is fully wound on the second reel 16; and likewise, the second leader strip 37 is of a length to be pulled into the full view exposure at the case edge opening when the tape is fully wound on the first reel 15. These conditions are exemplified by the circumstance that the leader strips extend fully between the idler rollers 21, as illustrated in FIGS. 3 and 4. For the illustrated cassette each leader is about six inches long, and short strips 50 and 51 of adhesive attach the ends of the leaders with the end portions of the magnetic tape. For this purpose, the strips 50 and 51 may consist of plastic material coated with an adhesive which bonds to the magnetic tape and the leader strip under pressure. The leaders themselves may consist of plastic material such as PVC.

Finally, the first leader strip 35 has one distinguishing color extending sufficiently along the cassette edge openings when the tape is fully wound on the second reel to indicate such full winding; and likewise, the second leader strip 37 has another distinguishing color extending sufficiently along the edge openings of the case when the tape is fully wound on the first reel 15 to indicate such full winding. Typically, one of the distinguishing colors is red, and the other distinguishing color is green, one or the other of these colors being fully visible at the edge openings no matter which face of the cassette case is directed upwardly. As a result, there is no doubt in the user's mind as to the condition of winding of the magnetic tape with respect to the reels, and he may properly locate the cassette on the playback equipment for playing the tape in the proper direction. Preferably, the entireties of the respective leaders have the red and green colors, as indicated in the drawings.

We claim:

1. In combination with a tape cassette including a hollow case and a pair of magnetic tape winding reels mounted in the case to be turned when the cassette is removably mounted on playback equipment, the case having an elongated opening along one edge thereof to expose tape traveling lengthwise along said edge to playback equipment heads that engage and magnetically read the tape, the improvement comprising:

a first leader strip attached at one end to a first reel and at the opposite end to one end portion of magnetic tape, and a second leader strip attached at one end to a second reel and at the opposite end to the opposite end portion of the magnetic tape, the first leader strip being of a length to be pulled into full view exposure at said case edge opening when the tape is fully wound on the second reel, and the second leader strip being of a length to be pulled into full view exposure at said case edge opening when the tape is fully wound on the first reel, the first leader strip having one distinguishing color extending sufficiently along said opening when the tape is fully wound on the second reel to indicate said full winding on the second reel, and the second leader strip having another distinguishing color extending sufficiently along said opening when the tape is fully wound on the first reel to indicate said full winding on the first reel.

2. The combination of claim 1 in which the first tape leader consists of plastic material and has a reddish color, and the second tape leader consists of plastic material and has a greenish color.

3. The combination of claim 1 in which said one color extends throughout the exposed length of the first leader along said opening when the tape is fully wound on the second reel, and said other color extends throughout the exposed length of the second leader along said opening when the tape is fully wound on the first reel.

4. The combination of claim 3 in which each leader is about six inchs long, and including a short strip of adhesive material bonding each leader to the magnetic tape.

References Cited

UNITED STATES PATENTS

| | | | |
|---|---|---|---|
| 2,894,700 | 7/1959 | Roberts et al. | 242—55.13 |
| 2,937,818 | 5/1960 | Zorn | 242—55.13 |
| 2,988,295 | 6/1961 | Loewe | 242—55.13 |
| 3,258,215 | 6/1966 | Ono | 242—55.13 |

LEONARD D. CHRISTIAN, *Primary Examiner.*

U.S. Cl. X.R.

242—71.3; 352—235